(12) United States Patent
Isaji et al.

(10) Patent No.: US 12,142,883 B2
(45) Date of Patent: Nov. 12, 2024

(54) TERMINAL CONNECTION UNIT

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yusuke Isaji, Mie (JP); Hitoshi Takeda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 355 days.

(21) Appl. No.: 17/794,891

(22) PCT Filed: Jan. 26, 2021

(86) PCT No.: PCT/JP2021/002579
§ 371 (c)(1),
(2) Date: Jul. 22, 2022

(87) PCT Pub. No.: WO2021/157420
PCT Pub. Date: Aug. 12, 2021

(65) Prior Publication Data
US 2023/0072016 A1   Mar. 9, 2023

(30) Foreign Application Priority Data
Feb. 4, 2020   (JP) ................................ 2020-017405

(51) Int. Cl.
*H01R 24/76*   (2011.01)
*H01R 9/24*   (2006.01)
(Continued)

(52) U.S. Cl.
CPC .............. *H01R 24/76* (2013.01); *H01R 9/24* (2013.01); *H01R 13/6315* (2013.01); *H01R 13/748* (2013.01); *H01R 24/20* (2013.01)

(58) Field of Classification Search
CPC ........ H01R 35/02; H01R 24/76; H01R 24/20; H01R 9/24; H01R 13/6315; H01R 13/748
(Continued)

(56) References Cited

U.S. PATENT DOCUMENTS 2,055,114 A * 9/1936 Woernley ................ H01H 1/225
439/737
2,403,642 A * 7/1946 Draxler .................... H01R 9/24
33/18.1
(Continued)

FOREIGN PATENT DOCUMENTS

EP   2808950 A1 * 12/2014 ........... H01R 13/502
JP   3002038   9/1994
(Continued)

OTHER PUBLICATIONS

International Search Report issued in International Bureau of WIPO Patent Application No. PCT/JP2021/002579, dated Apr. 20, 2021, along with an English translation thereof.

*Primary Examiner* — Marcus E Harcum
(74) *Attorney, Agent, or Firm* — Greenblum & Bernstein, P.L.C.

(57) ABSTRACT

A terminal connection unit has a novel structure that enables advantageously absorbing tolerance between positions of a terminal fitting and a connection portion while also ensuring a good state of connection between the terminal fitting and the connection portion. A terminal connection unit includes: a current-carrying member that has a connection portion for connection to a terminal fitting provided at the terminal end of an electric wire; and a support portion that fixedly supports the current-carrying member. The current-carrying
(Continued)

member includes a fixing portion that is fixed to the support portion, and an extendable portion that couples the connection portion and the fixing portion to each other and can extend and contract in the first direction. The support portion includes an attachment portion that is attached to the connection portion and is displaceable in a first direction.

8 Claims, 8 Drawing Sheets

(51) Int. Cl.
  *H01R 13/631* (2006.01)
  *H01R 13/74* (2006.01)
  *H01R 24/20* (2011.01)
(58) Field of Classification Search
  USPC .............................. 439/660, 737, 810, 811
  See application file for complete search history.

(56) References Cited

U.S. PATENT DOCUMENTS

| | | | | |
|---|---|---|---|---|
| 4,241,965 A | * | 12/1980 | Wilson | H01R 35/02 |
| | | | | 439/31 |
| 5,317,474 A | * | 5/1994 | Capper | H01T 4/06 |
| | | | | 361/111 |
| 5,321,577 A | * | 6/1994 | Capper | H01R 13/6666 |
| | | | | 361/111 |
| 5,496,192 A | * | 3/1996 | Hower | H01R 4/2441 |
| | | | | 439/409 |
| 7,704,105 B2 | * | 4/2010 | Bitz | H01R 4/34 |
| | | | | 439/810 |
| 2007/0059992 A1 | * | 3/2007 | Kim | H01R 4/36 |
| | | | | 439/810 |
| 2011/0316373 A1 | | 12/2011 | Kobayashi et al. | |
| 2014/0024266 A1 | | 1/2014 | Kashiwada et al. | |
| 2014/0120767 A1 | | 5/2014 | Itsuki et al. | |
| 2020/0028298 A1 | | 1/2020 | Nishio et al. | |

FOREIGN PATENT DOCUMENTS

| | | |
|---|---|---|
| JP | 11-273514 | 10/1999 |
| JP | 2011-234427 | 11/2011 |
| JP | 2014-022266 | 2/2014 |
| JP | 2014-086350 | 5/2014 |
| JP | 2015-082466 | 4/2015 |
| WO | 2011/055806 | 5/2011 |
| WO | 2018/180480 | 10/2018 |

* cited by examiner

TERMINAL CONNECTION UNIT

TECHNICAL FIELD

The present disclosure relates to a terminal connection unit that includes a connection portion for connection to a terminal fitting provided at the terminal end of an external electric wire.

BACKGROUND ART

Conventionally, electrical connection boxes as well as various devices and the like for installation in vehicles have been provided with a terminal connection unit that includes a connection portion for connection to a terminal fitting provided at the terminal end of an external electric wire. As described in Patent Document 1 for example, such a terminal connection unit includes a support portion that fixedly supports a current-carrying member routed in various devices or an electrical connection box, and a connection portion provided at an end portion of the current-carrying member is attached to an attachment portion provided on the support portion.

The terminal fittings provided at the terminal ends of electric wires tend to vary in position relative to the connection portion due to tolerance or the like of the electric wires. In view of this, Patent Document 1 proposes the absorption of positional tolerance between the terminal fittings and the connection portion with use of a structure in which the connection portion to which the terminal fittings are to be bolted is formed with an elongated shape, bolt insertion holes are formed as elongated holes, and the fastening positions of the terminal fittings can be changed in the lengthwise direction of the connection portion.

CITATION LIST

Patent Documents

Patent Document 1: JP 2011-234427A

SUMMARY OF INVENTION

Technical Problem

However, with a structure in which the connection portion to which the terminal fittings are to be bolted is formed with an elongated shape and furthermore the bolt insertion holes are formed as elongated holes, the bolt insertion holes occupy a wide range in the connection portion, and therefore it is not possible to ensure a sufficient area of contact between the terminal fittings and the connection portion. For this reason, it is difficult to sufficiently reduce the conduction resistance at the location of contact between a terminal fitting and the connection portion, and there is also an inherent problem that heat generation tends to be large, which has caused problems such as the melting of peripheral members due to heat generation in some cases.

In view of this, an object of the present disclosure is to provide a terminal connection unit having a novel structure that enables advantageously absorbing positional tolerance between a terminal fitting and the connection portion while also ensuring a good connection state between the terminal fitting and the connection portion.

Solution to Problem

A terminal connection unit according to an aspect of the present disclosure includes: a current-carrying member including a connection portion configured to be connected to a terminal fitting provided at a terminal end of an electric wire; and a support portion configured to fixedly support the current-carrying member, wherein the current-carrying member includes a fixing portion configured to be fixed to the support portion, and an extendable portion that couples the connection portion and the fixing portion and is extendable and contractable in a first direction, and the support portion includes an attachment portion configured to be attached to the connection portion, the attachment portion being displaceable in the first direction.

Advantageous Effects of Invention

According to the present disclosure, it is possible to advantageously absorb positional tolerance between a terminal fitting and the connection portion while also ensuring a good connection state between the terminal fitting and the connection portion.

DESCRIPTION OF EMBODIMENTS

Description of Embodiments of Present Disclosure

Figure 1:
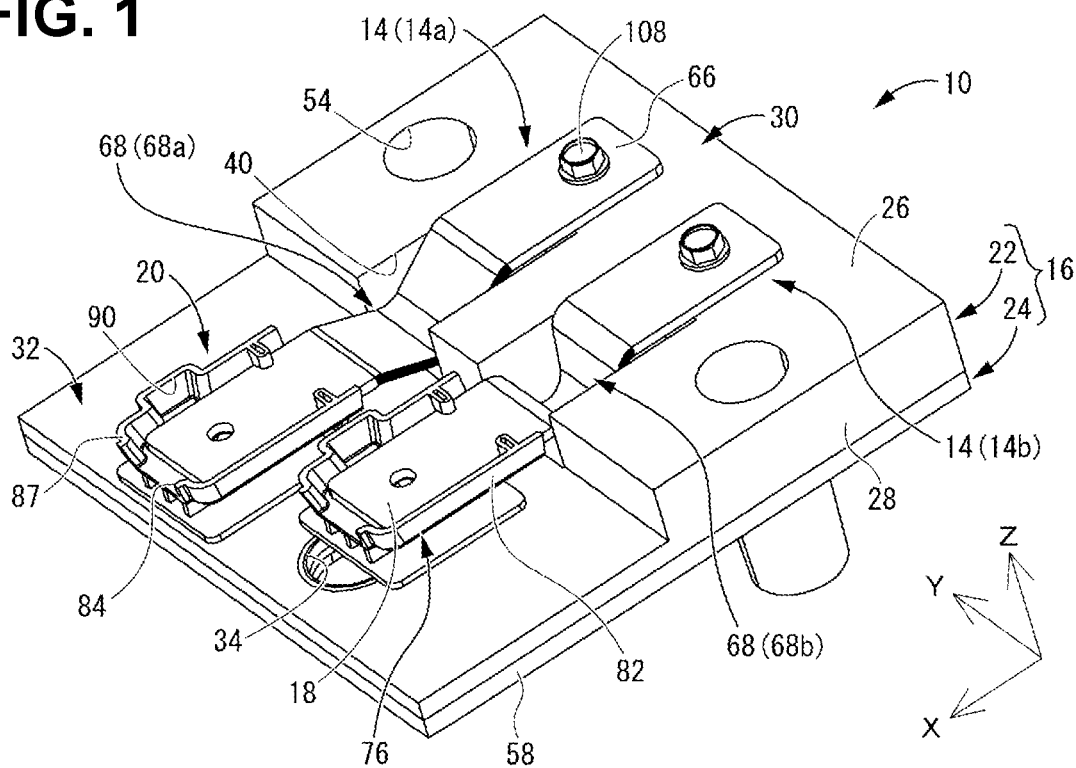
FIG. 1 is a perspective view of a terminal connection unit according to a first embodiment.
Figure 2:
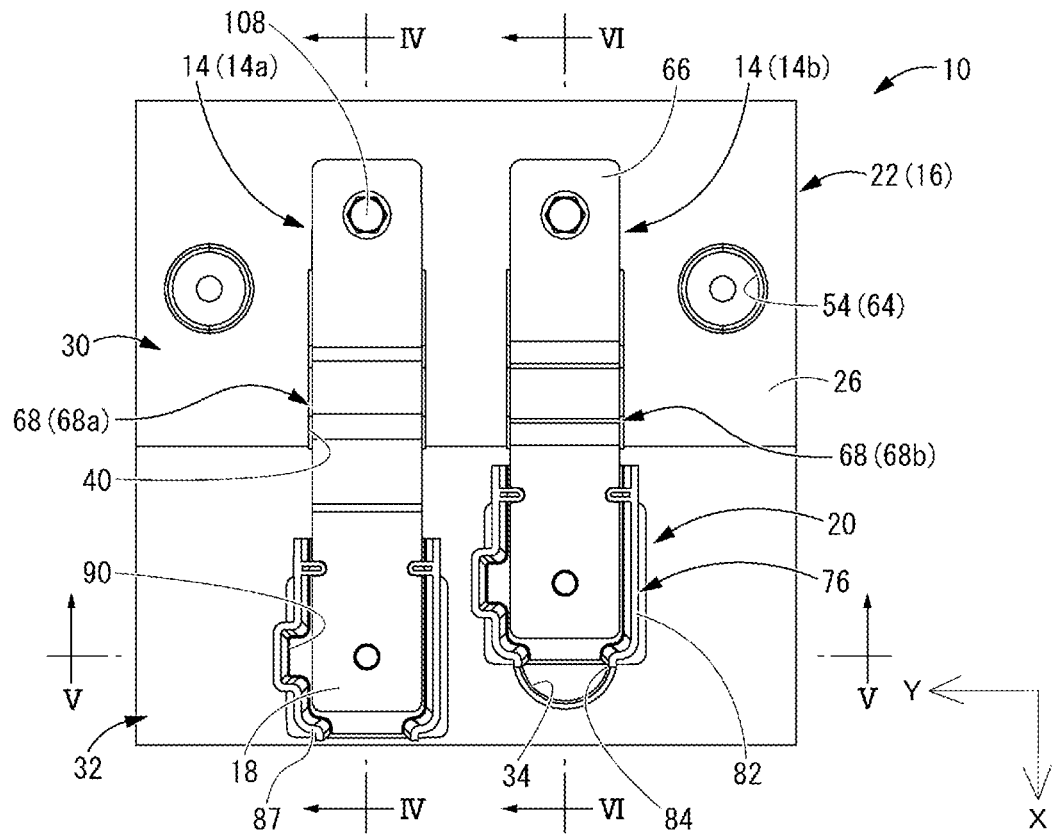
FIG. 2 is a plan view of the terminal connection unit shown in FIG. 1.

First, embodiments of the present disclosure will be listed and described.

A terminal connection unit according to an aspect of the present disclosure is:

(1) A terminal connection unit including: a current-carrying member including a connection portion configured to be connected to a terminal fitting provided at a terminal end of an electric wire; and a support portion configured to fixedly support the current-carrying member, wherein the current-carrying member includes a fixing portion configured to be fixed to the support portion, and an extendable portion that couples the connection portion and the fixing portion and is extendable and contractable in a first direction, and the support portion includes an attachment portion configured to be attached to the connection portion, the attachment portion being displaceable in the first direction.

According to the terminal connection unit of the above aspect of the present disclosure, the connection portion of the current-carrying member is coupled to the fixing portion that is fixed to the support portion via the extendable portion that can extend and contract in the first direction. Also, the attachment portion of the support portion for attachment to the connection portion is displaceable in the first direction. For this reason, the position of the connection portion can be changed by displacement of the attachment portion and extension and contraction of the extendable portion in the first direction, thus making it possible to advantageously absorb positional tolerance between the terminal fitting and the connection portion. As a result, it is not necessary to provide an elongated bolt insertion hole in the connection portion of the current-carrying member as in conventional technology, and it is possible to absorb tolerance while also achieving a large area of contact between the terminal fitting and the connection portion. In this way, according to the terminal connection unit of the above aspect of the present embodiment, it is possible to achieve both a good state of connection between the terminal fitting and the connection portion and the absorption of positional tolerance between the terminal fitting and the connection portion.

The terminal connection unit may be configured as a terminal block structure that includes a current-carrying member and a support portion that supports the current-carrying member, or as an electrical connection box in which the current-carrying member is housed in a case that includes the support portion. The first direction, which is the extension/contraction direction of the extendable portion, can be set to any direction in which tolerance occurs between the terminal fitting and the connection portion.

(2) It is preferable that the extendable portion of the current-carrying member is constituted by a laminated bus bar in which multiple layers of metal plates are stacked. Due to the extendable portion being constituted by a curved laminated bus bar, the extendable portion can bend easily, and the extendable portion can extend and contract in the first direction by changing the curvature at which the extendable portion is bent. The fixing portion and the connection portion coupled to the extendable portion can be easily formed by integration with end portions of the laminated bus bar through welding or the like. Accordingly, the current-carrying member having the extendable portion can be manufactured at low cost.

(3) It is preferable that the extendable portion of the current-carrying member is constituted by a braided wire. If the extendable portion is constituted by a braided wire, the extendable portion can easily flex and deform in the first direction. Accordingly, it is possible to reduce the burden on the operator when connecting the terminal fitting to the connection portion.

(4) It is preferable that the attachment portion is displaceable in the first direction while attached to the support portion. This is because if the attachment portion displaceable in the first direction when attached to the support portion, even after the terminal fitting is connected to the connection portion that has been attached to the attachment portion, displacement of the electric wire occurring due to the surrounding thermal environment, vibration, or the like can be advantageously absorbed by displacement of the attachment portion. As a result, it is possible to prevent a load from being applied to the portion where the terminal fitting and the connection portion are connected to each other.

(5) It is preferable that the support portion includes a recession configured to accommodate the extendable portion. This is because although the shape of the extendable portion changes due to extension/contraction deformation, the support portion is provided with the recession for accommodating the extendable portion, thus making it possible to suppress or avoid interference between the support portion and the extendable portion. It is preferable that the depth of the recession is set so as to be able to accommodate the extendable portion without coming into contact with it in the most contracted state.

(6) It is preferable that the support portion includes a support surface configured to support the fixing portion of the current-carrying member, and an attachment position of the connection portion on the attachment portion is no higher than a height position of the support surface. This is because if the attachment position of the connection portion on the attachment portion is at a height position the same as or lower than the support surface that supports the fixing portion, it is possible to prevent the extendable portion from interfering with the attachment portion when in an extended state.

(7) It is preferable that the attachment portion includes a fastener housing portion in which a fastener component is housed. This is because in the case where the terminal fitting is fixed and fastened to the connection portion using fastener components such as a bolt and a nut, one of the fastener components, such as the bolt or the nut, is housed in the fastener housing portion of the attachment portion, thus making it possible to advantageously improve workability when fastening together the terminal fitting and the connection portion.

(8) It is preferable that the support portion includes a through hole that is elongated in the first direction, the attachment portion includes a holder configured to hold the connection portion, an elongated locking plate arranged facing a bottom surface of the holder across a gap, and a coupling portion that couples the locking plate to the bottom surface, the locking plate is insertable into the through hole when a lengthwise direction of the locking plate is matched with the first direction, and the attachment portion is attached at a normal position relative to the support portion by inserting the locking plate into the through hole and rotating the holder such that the lengthwise direction is orthogonal to the first direction, and when the attachment portion is at the normal position, the locking plate engages with a peripheral edge portion of the through hole, and the attachment portion is attached to the support portion in a state where detachment is prevented and displacement in the first direction is allowed. After the locking plate, which is coupled to the bottom surface of the holder of the attachment portion, is inserted into the through hole of the support portion, the holder is rotated to the normal position. According to this simple operation, the locking portion engages with a peripheral edge portion of the through hole, and thus the attachment portion can be attached to the support portion in a state where detachment is prevented and displacement in the first direction is allowed.

(9) It is preferable that a positioning protrusion is provided at a peripheral edge portion of the locking plate, and a positioning protrusion insertion portion is provided at a peripheral edge portion of the through hole. Accordingly, by aligning the positioning protrusion of the locking plate with the positioning hole of the through hole, it is possible to improve workability when attaching the locking plate to the through hole.

DETAILS OF EMBODIMENTS OF PRESENT DISCLOSURE

Specific examples of a terminal connection unit according to an aspect of the present disclosure will be described below with reference to the drawings. Note that the present disclosure is not limited to these examples, but rather is indicated by the scope of claims and is intended to include all modifications within a meaning and scope equivalent to the scope of claims.

First Embodiment

The following describes a first embodiment of the present disclosure with reference to FIGS. 1 to 10. The terminal connection unit 10 is for installation in a vehicle (not shown) such as an electric automobile or a hybrid automobile, and high-voltage electric wires 12 (see FIG. 10) that extend inside a battery pack are connected to the terminal connection unit 10. The high-voltage electric wires 12 have a large diameter and cannot bend easily, thus making it difficult to bend the electric wires 12 in order to absorb tolerance. For the sake of clarity, the figures show electric wires 12a and 12b that have different lengths due to tolerance and/or current-carrying members 14a and 14b that are connected to the electric wires 12a and 12b. The terminal connection unit 10 according to an aspect of the present disclosure need only include at least one current-carrying member 14. When there are portions that are related to the provision of the two current-carrying members 14a and 14b but have a similar structure, the structure of only one of such portions will be described. There are no limitations on the orientation of the terminal connection unit 10 when installed in a vehicle, but in the following description, the upward direction is a Z direction in FIG. 1, the front direction is an X direction in FIG. 1, and the left direction is a Y direction in FIG. 1. When there are a plurality of members that are the same, there are cases where a reference numeral is given to only some of the members, and reference numerals are omitted for the other members.

Terminal Connection Unit 10

The terminal connection unit 10 includes the current-carrying members 14 for connection to the electric wires 12, and the support portion 16 that fixedly supports the current-carrying members 14. In each of the current-carrying members 14, the portion for connection to an electric wire 12 is a connection portion 18, and the connection portion 18 is attached to the support portion 16 via an attachment portion 20.

Support Portion 16

Figure 3:
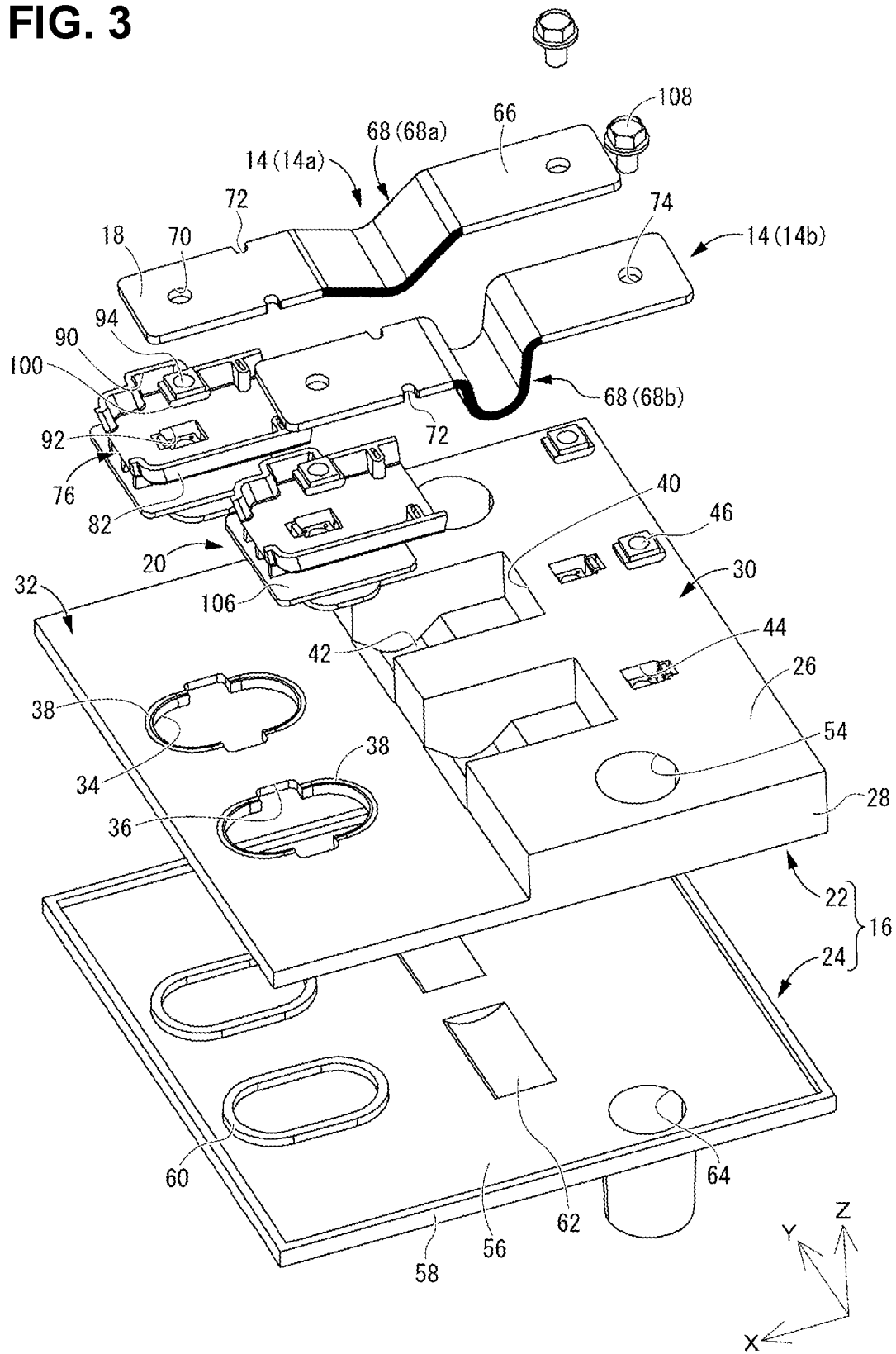
FIG. 3 is an exploded perspective view of the terminal connection unit shown in FIG. 1.

In the first embodiment, the support portion 16 has a hollow shape and is substantially rectangular in a plan view, and as shown in FIG. 3, includes an upper terminal block 22 and a lower terminal block 24 that can be separated from each other in the vertical direction.

The upper terminal block 22 is overall substantially shaped as a box that is open downward, and is made of an insulating synthetic resin. Specifically, the upper terminal block 22 includes an upper bottom wall portion 26 that has a substantially rectangular shape in a plan view, and a peripheral wall portion 28 that projects downward from the outer peripheral edge portion of the upper bottom wall portion 26. In the first embodiment, the upper surface of the upper terminal block 22 has a step, and the rear portion of the upper surface of the upper terminal block 22 is higher than the front portion of the upper surface. The rear portion of the upper surface of the upper terminal block 22 is a support surface 30 that supports later-described fixing portions 66 of the current-carrying members 14. The front portion of the upper surface of the upper terminal block 22 is an attachment surface 32 to which the attachment portions 20 are attached.

Through holes 34, which are elongated in a first direction (front-rear direction), are provided in an intermediate portion, with respect to the front-rear direction, of the formation region of the attachment surface 32 (front portion of the upper bottom wall portion 26). In the first embodiment, the through holes 34 have a substantially oval shape. The peripheral edge portion of each of the through holes 34 is provided with two positioning protrusion insertion portions 36 that are open inward in the left-right direction on respective sides in the left-right direction in a central portion with respect to the front-rear direction. Accordingly, the size of the through hole 34 in the left-right direction is partially larger at the positions where the positioning protrusion insertion portions 36 are formed. Also, in the peripheral edge portion of each of the through holes 34, ribs 38 that project upward are provided in the portions other than the positioning protrusion insertion portions 36. In other words, two ribs 38 having a circumferential length of approximately half the circumference are formed on respective sides in the front-rear direction so as to sandwich the positioning protrusion insertion portions 36. In first embodiment, the ribs 38 have a substantially semi-circular cross section. On the lower surface of the upper bottom wall portion 26, in the peripheral edge portion of each of the through holes 34, downward projecting portions 39 that project downward are provided in the portions other than the positioning protrusion insertion portions 36. In other words, two downward projecting portions 39 having a circumferential length of approximately half the circumference are formed on respective sides in the front-rear direction so as to sandwich the positioning protrusion insertion portions 36.

In the formation region of the support surface 30 (rear portion of the upper bottom wall portion 26), notch-shaped recessions 40 that are open forward and upward are provided rearward of the through holes 34. The bottom wall portion of each of the recessions 40 is partially constituted by a curved wall portion 42 that protrudes downward. In the first embodiment, the attachment surface 32 and the bottom surfaces of the recessions 40 (the portions excluding the curved wall portions 42) are located on the same horizontal plane (XY plane). The lowermost portions of the curved wall portions 42 are located lower than the attachment surface 32 and the bottom surfaces of the recessions 40.

On the support surface 30, housing recessed portions 44 are provided rearward of the recessions 40. The housing recessed portions 44 have a substantially rectangular shape in a plan view and are open upward. In the first embodiment, nuts 46 for fixing later-described fixing portions 66 of the current-carrying members 14 are housed in the housing recessed portions 44. The nuts 46 are preferably fixed to the housing recessed portions 44 by male-female fitting, but there is no limitation to this. The nuts 46 may be fixed to the housing recessed portions 44 by adhesion or the like instead of male-female fitting. Alternatively, the nuts 46 may be integrally molded with the upper terminal block 22 by insert molding.

In the first embodiment, holding tube portions 47, which are substantially shaped as a bottomed tube and are for holding the nuts 46 from below, are integrally formed in the housing recessed portions 44. Deformation allowing spaces 48 are provided rearward of the housing recessed portions 44, and rear wall portions of the housing recessed portions 44 can elastically deform in the front-rear direction. Inclined surfaces 50 that are inclined downward and forward are formed at the upper ends of the rear wall portions of the elastically deformable housing recessed portions 44. Two inclined surfaces 52 that are inclined downward and inward in the front-rear direction are formed on respective sides of the lower surface of each of the nuts 46 in the front-rear direction. Accordingly, when the nut 46 is pushed into the corresponding housing recessed portion 44 from above, the inclined surfaces 50 of the housing recessed portion 44 and the inclined surfaces 52 of the nut 46 come into contact with each other, and the rear wall portion of the housing recessed portion 44 elastically deforms rearward. As a result, the nut 46 can be placed in the housing recessed portion 44, and when the rear wall portion of the housing recessed portion 44 undergoes elastic restoring deformation, the nut 46 can be fixedly held above the holding tube portion 47 in the housing recessed portion 44.

In the first embodiment, two circular through holes 54 that extend in the vertical direction are respectively formed in left and right portions of the upper bottom wall portion 26, and are in communication with the later-described bolt insertion holes 64 of the lower terminal block 24, and attachment bolts (not shown) can be inserted through the through holes 54.

The lower terminal block 24 is overall substantially shaped as a box that is open upward, or is substantially shaped as a flat plate. In the first embodiment, the lower terminal block 24 includes a bottom wall portion 56 that has substantially the same shape as the upper bottom wall portion 26 of the upper terminal block 22, and a peripheral wall portion 58 that projects upward from the outer peripheral edge portion of the bottom wall portion 56. When the upper terminal block 22 and the lower terminal block 24 are arranged on one another and fixed together, the lower opening portion of the upper terminal block 22 is closed due to being covered by the lower terminal block 24. The lower terminal block 24 can be formed by a metal or a synthetic resin, for example. It may also be constituted by a bracket attached to the vehicle body.

In the bottom wall portion 56 of the lower terminal block 24, substantially oval-shaped upward projecting portions 60 are provided at positions substantially corresponding to the downward projecting portions 39 of the upper bottom wall portion 26 of the upper terminal block 22. Curved wall portions 62 that protrude downward are formed in the bottom wall portion 56 of the lower terminal block 24 at positions substantially corresponding to the curved wall portions 42 of the upper terminal blocks 22. Accordingly, when the upper terminal block 22 and the lower terminal block 24 are placed on one another, contact between the curved wall portions 42 and the bottom wall portion 56 can be avoided. Bolt insertion holes 64 that extend through the bottom wall portion 56 in the vertical direction are formed in the lower terminal block 24 at positions substantially corresponding to the through holes 54 of the upper terminal block 22.

Current-Carrying Member 14

The current-carrying members 14 are made of a conductive metal, and in the first embodiment, are substantially rectangular in a plan view. The front portion of each of the current-carrying members 14 is a substantially rectangular plate-shaped connection portion 18. The rear portion of the current-carrying member 14 is a substantially rectangular plate-shaped fixing portion 66 that is supported by the support portion 16. The connection portion 18 and the fixing portion 66 are connected by an extendable portion 68 that can extend and contract in the front-rear direction, which is the first direction. Accordingly, the overall length of the current-carrying member 14 in the front-rear direction can increase and decrease. The connection portion 18, the fixing portion 66, and the extendable portion 68 may be made of different materials.

Figure 4:
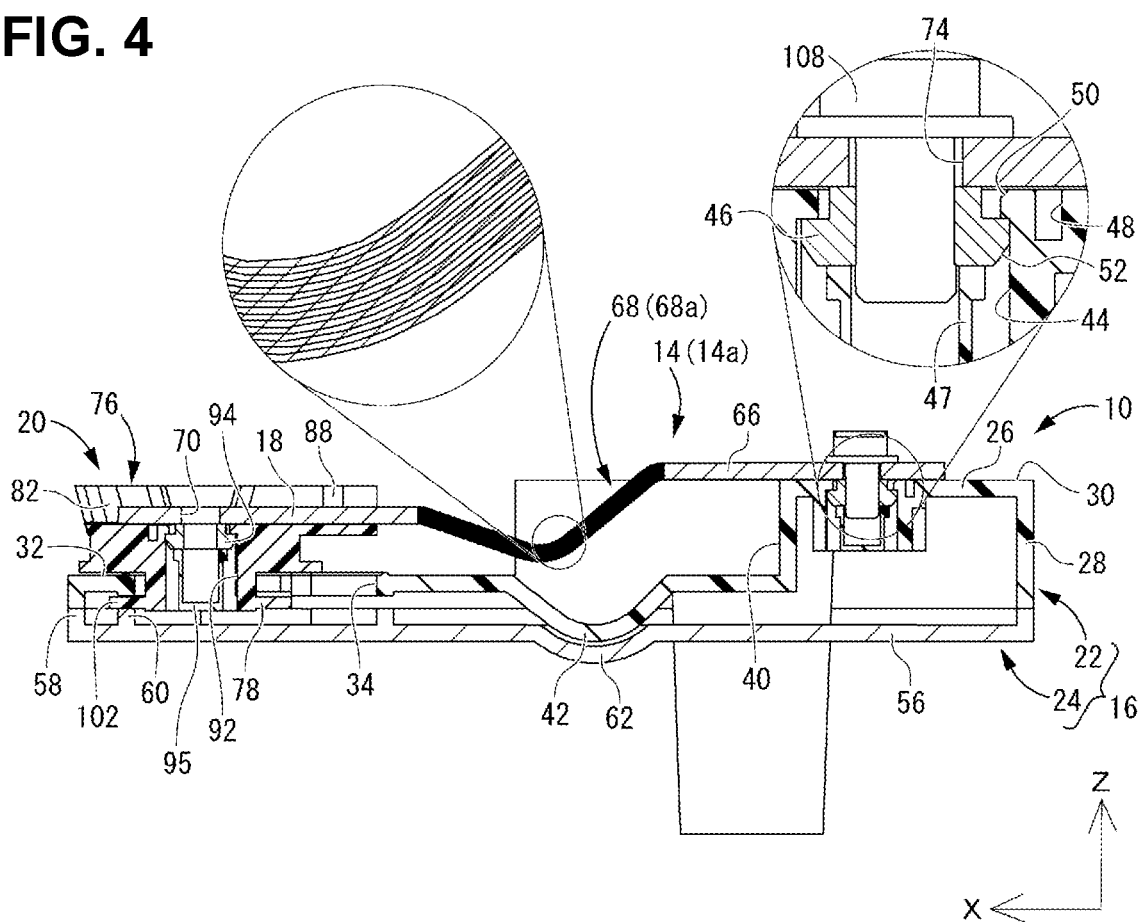
FIG. 4 is a cross-sectional view taken along line IV-IV in FIG. 2.
Figure 6:
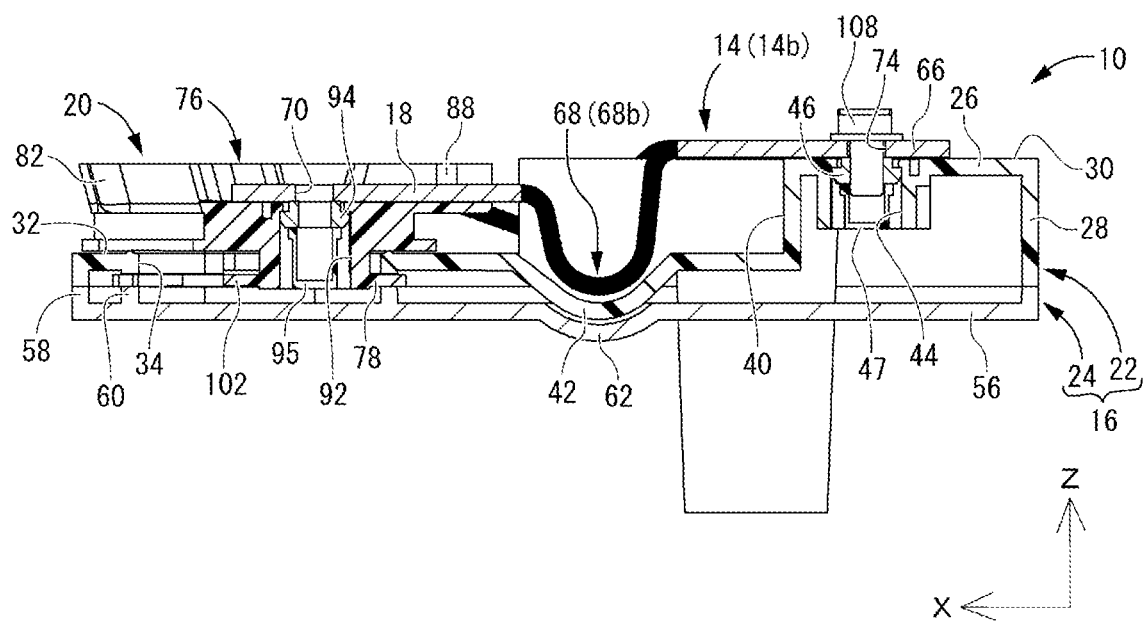
FIG. 6 is a cross-sectional view taken along line VI-VI in FIG. 2.
Figure 7:
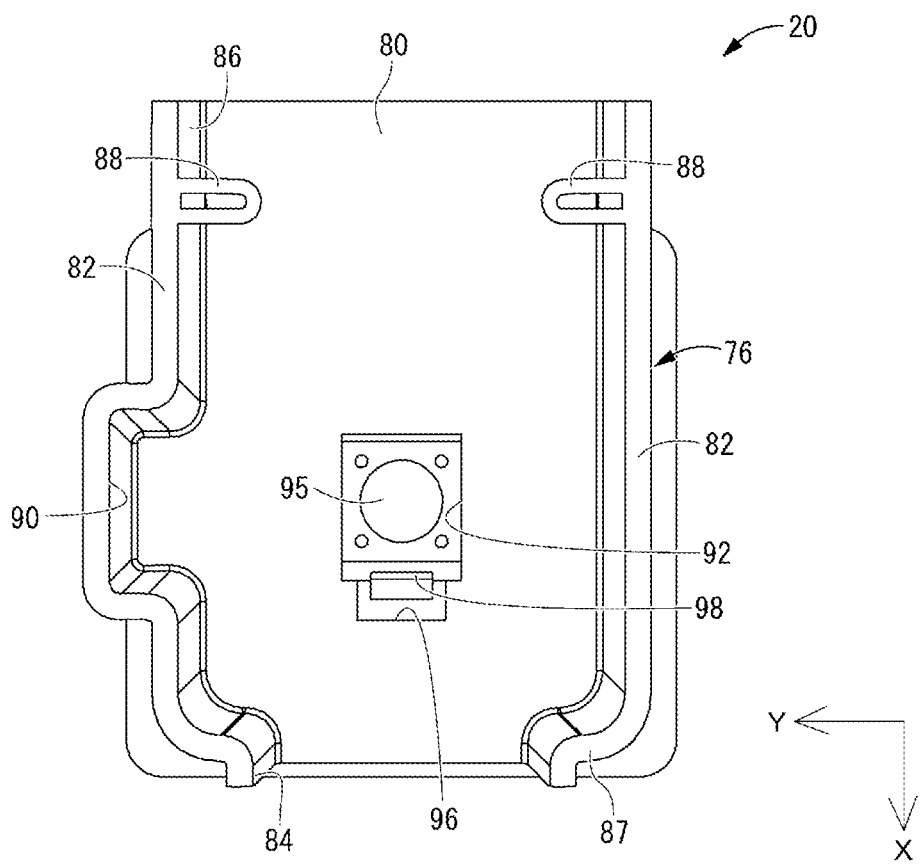
FIG. 7 is a plan view showing an attachment portion included in the terminal connection unit shown in FIG. 1.

In the figures, for the sake of clarity, the current-carrying members 14a and 14b have different overall lengths in the front-rear direction in accordance with the lengths of the extendable portions 68 in the front-rear direction. Specifically, FIG. 4 shows an extendable portion 68 in the state where the length in the front-rear direction is the longest, and FIG. 6 shows an extendable portion 68 in the state where the length in the front-rear direction is the shortest. In FIG. 1 and the like, the current-carrying member 14a having the extendable portion 68a with the longest length in the front-rear direction and the current-carrying member 14b having the extendable portion 68b with the shortest length in the front-rear direction are shown side by side in the left-right direction.

A through hole 70 that extends in the vertical direction is formed in the connection portion 18 of each of the current-carrying members 14. In a portion of the connection portion 18 rearward of the through hole 70, notch-shaped positioning recessed portions 72 and 72 that are open outward in the left-right direction are respectively formed at two edge portions in the left-right direction. A through hole 74 that extends in the vertical direction is also formed in the fixing portion 66 of the current-carrying member 14.

As shown in FIG. 4, the extendable portion 68 in the first embodiment is constituted by a laminated bus bar in which a plurality of metal flat plates are stacked in multiple layers in the vertical direction. The two end portions in the front-rear direction of the extendable portion 68 constituted by the laminated bus bar are respectively fixed to the connection portion 18 and the fixing portion 66 by a means such as welding.

Attachment Portion 20

The attachment portions 20 are made of an insulating synthetic resin and each include a holder 76 that holds the connection portion 18 of the corresponding current-carrying member 14, and a locking plate 78 that is locked to the support portion 16. The holder 76 and the locking plate 78 are separated from each other in the vertical direction, that is to say, the locking plate 78 faces a bottom surface 79 of the holder 76 across a gap.

Figure 5:
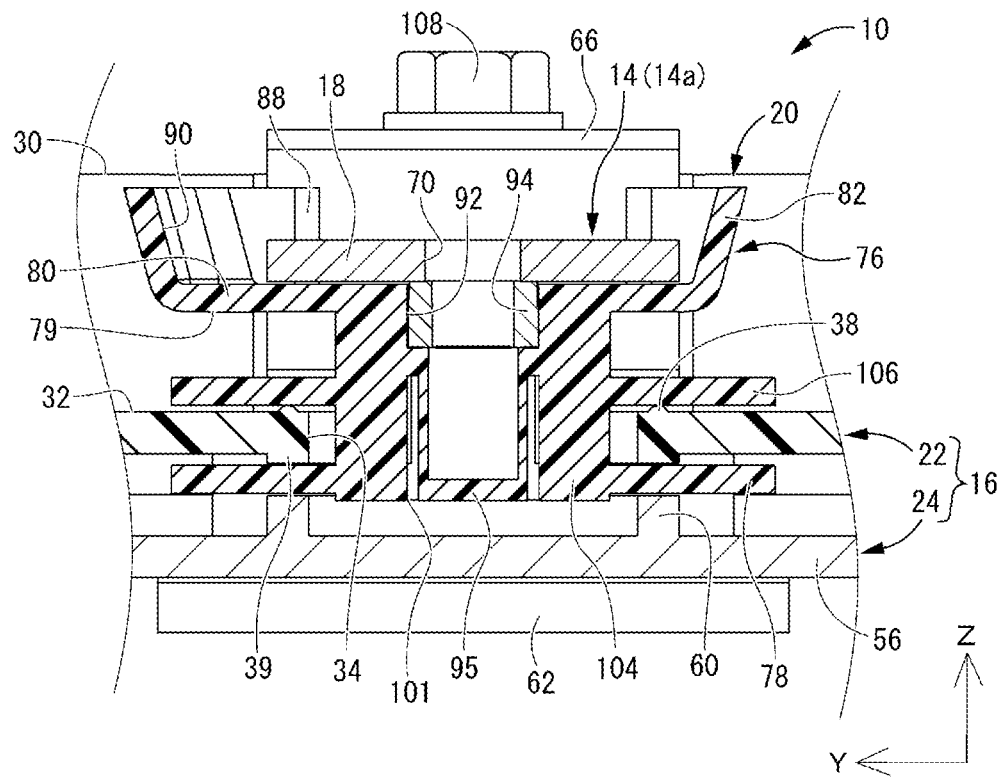
FIG. 5 is a vertical cross-sectional view showing an enlargement of a main portion of the V-V cross section in FIG. 2.

The holder 76 is overall elongated in the front-rear direction, and includes a holding plate portion 80 that has a substantially rectangular plate shape, and two vertical wall portions 82 that project upward from the two end portions of the holding plate portion 80 in the left-right direction. In the first embodiment, as shown in FIG. 5, the two vertical wall portions 82 are inclined relative to the vertical direction, and are inclined outward in the left-right direction as they extend upward. These two vertical wall portions 82 are integrated with the holding plate portion 80 over substantially the entire length thereof in the front-rear direction. In other words, in the holder 76, the vertical wall portions 82 are not provided on the two sides in the front-rear direction, and the space surrounded by the holding plate portion 80 and the two vertical wall portions 82 is open on the two sides in the front-rear direction. Accordingly, a front opening 84 is formed at the front end of the holder 76, and a rear opening 86 is formed at the rear end of the holder 76.

Two front wall portions 87 that extend inward toward each other are integrally formed with the front end portions of the two vertical wall portions 82. Accordingly, the left-right dimension between the two vertical wall portions 82 at the front opening 84 is smaller than the left-right dimension between the two vertical wall portions 82 at the rear opening 86.

In the first embodiment, two positioning protruding portions 88 that project inward toward each other (inward in the left-right direction) are respectively provided in rear portions of the two vertical wall portions 82. An engaging recessed portion 90 that is open inward (i.e., to the right) in the left-right direction is integrally formed in one vertical wall portion 82 (the left vertical wall portion 82 in the first embodiment), and the engaging recessed portion 90 has a certain length in the front-rear direction. Accordingly, the distance between the two vertical wall portions 82 in the left-right direction is partially larger in the portion where the engaging recessed portion 90 is formed.

The holding plate portion 80 of the holder 76 includes a fastener housing portion 92 that is open upward, and in the first embodiment, a nut 94 is the fastener component that is accommodated. In the first embodiment, the fastener housing portion 92 is provided at the approximate center of the holding plate portion 80. The structure of the fastener housing portion 92 is similar to that of the housing recessed portion 44 in the support portion 16, that is to say, a holding tube portion 95 for holding the nut 94 from below is integrally formed in the fastener housing portion 92. A deformation allowing space 96 is provided in front of the fastener housing portion 92, and a front wall portion of the fastener housing portion 92 can elastically deform in the front-rear direction. An inclined surface 98 that is inclined downward toward the rear is formed at the upper end of the wall portion that constitutes the front portion of the fastener housing portion 92.

The structure of the nut 94 is similar to that of the nut 46 housed in the housing recessed portion 44, and two inclined surfaces 100 that are inclined downward and inward in the front-rear direction are formed on respective sides of the lower surface of the nut 94 in the front-rear direction. When the nut 94 is placed in the fastener housing portion 92, the inclined surface 98 of the fastener housing portion 92 and one of the inclined surfaces 100 of the nut 94 come in contact with each other, and thus the nut 94 can be smoothly guided into and housed in the fastener housing portion 92. The nut 94 may be fixed to the fastener housing portion 92 by adhesion or the like in place of or in addition to the male-female fitting as described above, or the nut and the attachment portion 20 may be integrally formed by insert molding.

Figure 8:
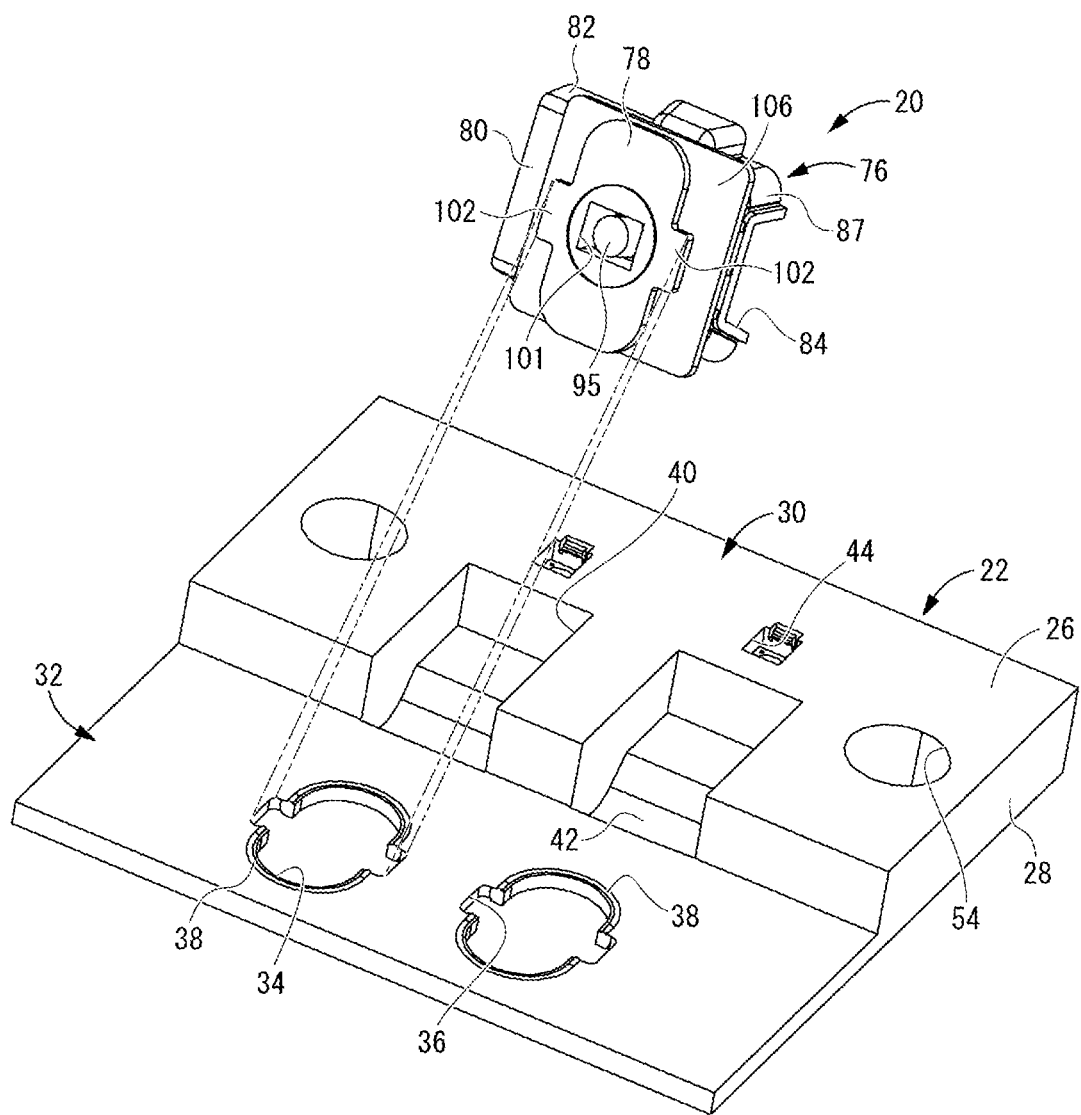
FIG. 8 is a perspective view showing an operation of attaching the attachment portion shown in FIG. 7 to a support portion.

As shown in FIG. 8 as well, the locking plate 78 has a substantially oval or rounded rectangular shape overall, and is elongated in a direction orthogonal to the extending direction of the holding plate portion 80. In other words, the locking plate 78 extends in the left-right direction while attached to the support portion 16. The lengthwise dimension of the locking plate 78 is smaller than the major axis dimension of the through hole 34 provided in the support portion 16, and is larger than the minor axis dimension of the through hole 34. When the lengthwise direction of the locking plate 78 and the lengthwise direction of the through hole 34 are aligned, the locking plate 78 can be inserted into the through hole 34.

A substantially rectangular through hole 101 that extends in the vertical direction is formed in a substantially central portion of the locking plate 78, and the holding tube portion 95 that integrally projects downward from the fastener housing portion 92 enters the through hole 101. Two positioning protrusions 102 are integrally formed at peripheral edge portions of the locking plate 78 in a central portion of the locking plate 78 with respect to the extending direction thereof (the left-right direction in the assembled state), and project outward away from each other in an orthogonal direction (the front-rear direction in the assembled state).

The holder 76 and the locking plate 78 are coupled by a coupling portion 104 that extends in the vertical direction. The coupling portion 104 has a substantially cylindrical shape overall and couples substantially central portions of the locking plate 78 and the bottom surface 79 of the holder 76. Specifically, a portion of the holder 76 circumferentially outward of the fastener housing portion 92 and a portion of the locking plate 78 circumferentially outward of the through hole 101 are connected by the coupling portion 104.

A guide plate portion 106 that projects circumferentially outward is integrally formed at an intermediate portion of the coupling portion 104 in the vertical direction. In the first embodiment, the guide plate portion 106 has a substantially rectangular plate shape extending in the XY plane. The guide plate portion 106 is provided at a substantially central portion of the coupling portion 104 with respect to the vertical direction, and opposes the holder 76 and the locking plate 78 across a certain separation distance in the vertical direction. In particular, in the first embodiment, the distance between the guide plate portion 106 and the locking plate 78 in the vertical direction is substantially equivalent to or slightly larger than the vertical dimension of the peripheral edge portion of the through hole 34 of the support portion 16, that is to say the vertical distance from the upper end of the rib 38 to the lower end of the downward projecting portion 39. A rib that extends in the front-rear direction, for example, may be provided between the holder 76 and the guide plate portion 106 in the vertical direction for the purpose of reinforcement or the like.

Assembly of Terminal Connection Unit 10

The following describes an example of assembly of the terminal connection unit 10. The assembly of the terminal connection unit 10 is not limited to the following description.

First, the current-carrying members 14, the attachment portions 20, the upper terminal block 22, and the lower terminal block 24 are each prepared, and the attachment portions 20 are attached to the upper terminal block 22. Nuts 94 and 46 are fitted into the fastener housing portions 92 and the housing recessed portions 44 of the attachment portions 20 and the upper terminal block 22. The nuts 94 and 46 may be fitted before or after the attachment portions 20 are attached to the upper terminal block 22.

When an attachment portion 20 is to be attached to the upper terminal block 22, as shown in FIG. 8, first, the lengthwise direction of the locking plate 78 of the attachment portion 20 and the lengthwise direction of the through hole 34 of the upper terminal block 22 (the front-rear direction, which is the first direction) are substantially aligned with each other. In this state, the attachment portion 20 is moved toward the upper terminal block 22, and the locking plate 78 is inserted into the through hole 34. In other words, the locking plate 78 is inserted into the through hole 34 in a state of being oriented such that the lengthwise direction is the first direction. At this time, the positioning protrusion insertion portions 36 provided at peripheral edge portions of the through hole 34 are aligned with the positioning protrusions 102 provided at peripheral edge portions of the locking plate 78, and thus the locking plate 78 can be easily inserted into the through hole 34. In this state, the holder 76 of the attachment portion 20 extends in the left-right direction. The guide plate portion 106 of the attachment portion 20 is placed over the two ribs 38 provided at peripheral edge portions of the through hole 34.

Figure 9:
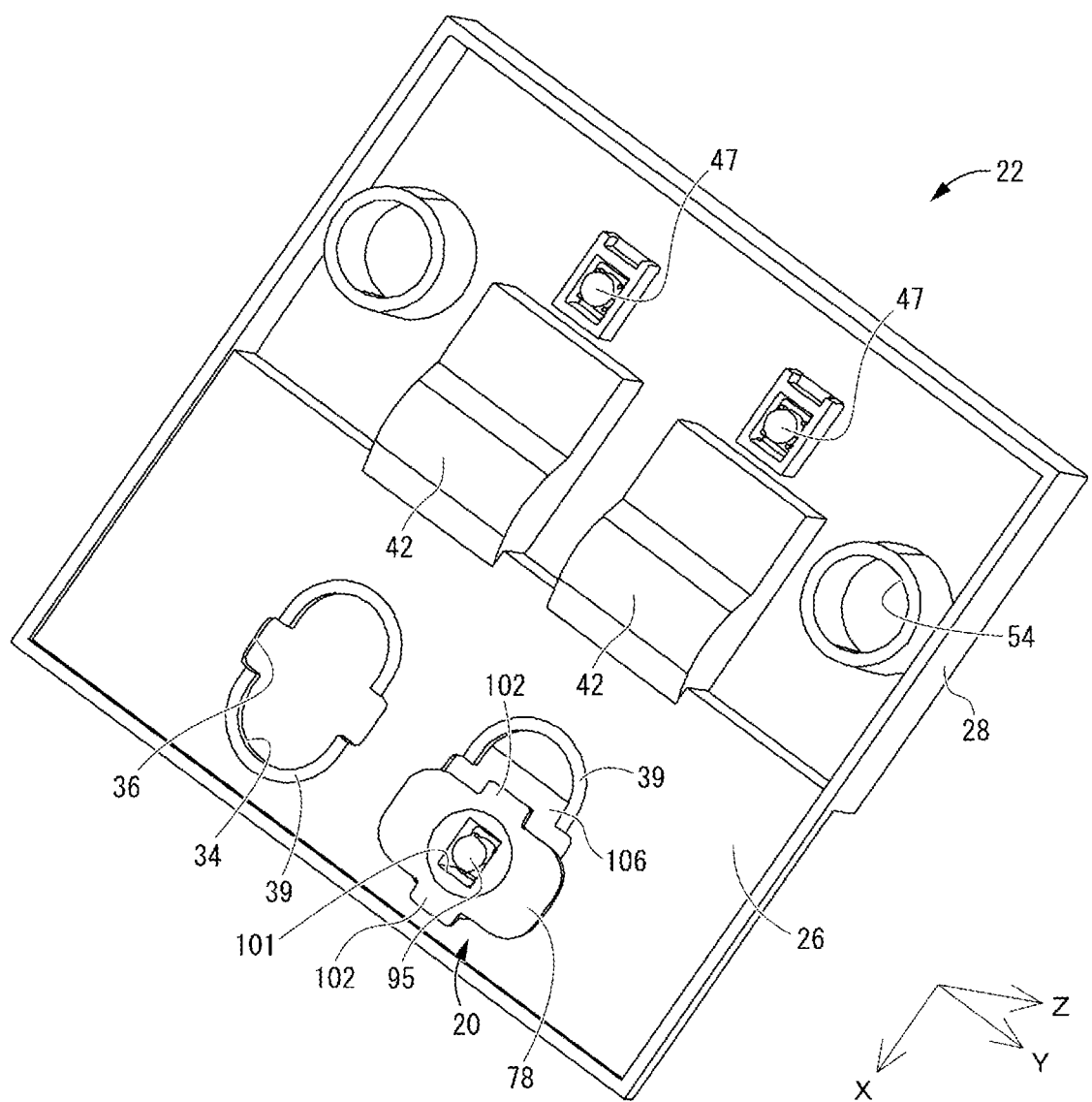
FIG. 9 is a perspective view, from the bottom surface side, showing a state in which the attachment portion shown in FIG. 7 has been attached at a normal position on the support portion.
Figure 10:
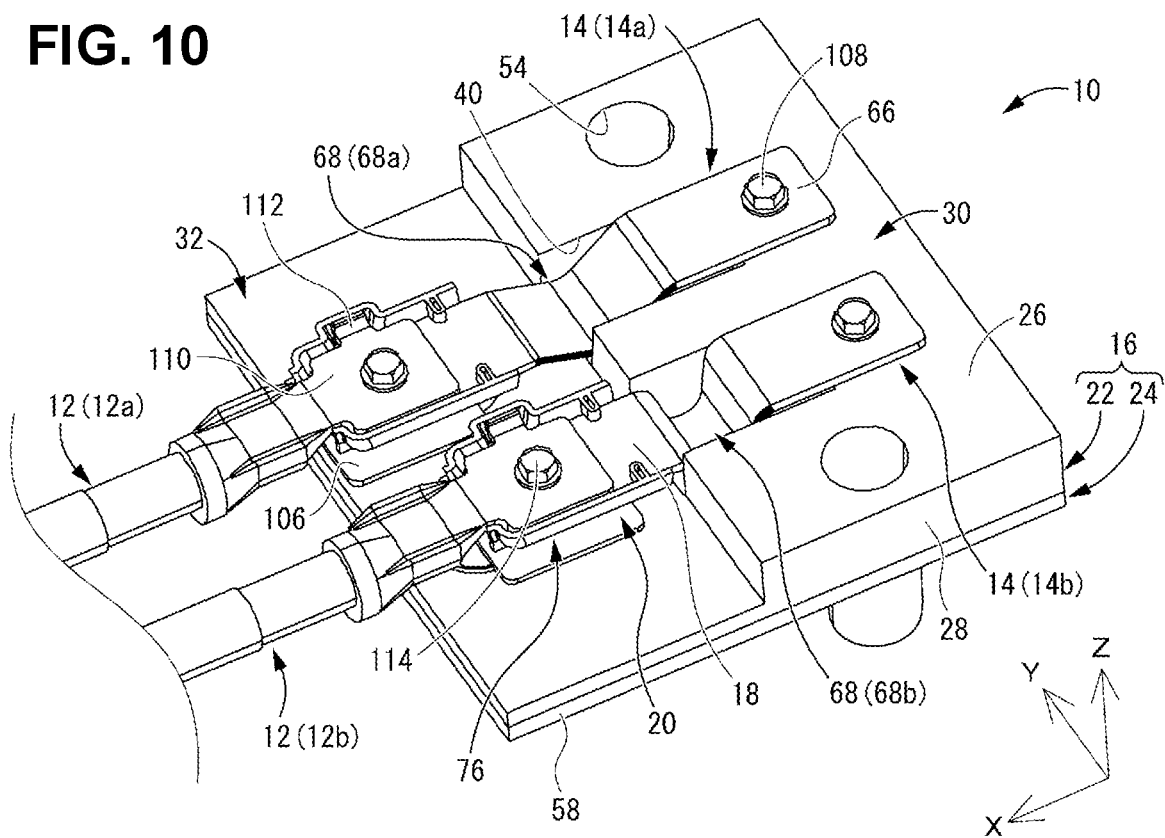
FIG. 10 is a perspective view showing specific examples of connection states of electric wires to the terminal connection unit shown in FIG. 1.

Next, the attachment portion 20 is rotated by 90°, relative to the upper terminal block 22, around the coupling portion 104 that extends in the vertical direction. Accordingly, as shown in FIG. 9, the attachment portion 20 is attached at a normal position relative to the support portion 16, in a state in which the locking plate 78 extends in the left-right direction, which is orthogonal to the first direction. At this normal position, the locking plate 78 engages with peripheral edge portions of the through hole 34. As a result, it is possible to prevent the attachment portion 20 from being pulled out upward from the upper terminal block 22. Also, as shown in FIG. 5, peripheral edge portions of the through hole 34 extend between the locking plate 78 and the guide plate portion 106 in the vertical direction. In other words, the coupling portion 104 is located in the through hole 34, and, due to the coupling portion 104 moving in the front-rear direction inside the through hole 34, the attachment portion 20 can be displaced relative to the upper terminal block 22 in the front-rear direction, which is the first direction.

In particular, in the first embodiment, when the attachment portion 20 moves relative to the upper terminal block 22, the guide plate portion 106 slides over the ribs 38 that have a substantially semicircular cross section, and thus the sliding resistance is reduced, and smooth movement can be realized. FIG. 9 shows a state in which the attachment portion 20 is located toward the front side of the upper terminal block 22, and to achieve this state, the attachment portion 20 may be rotated relative to the upper terminal block 22 and then moved in the front-rear direction, or alternatively, the attachment portion 20 may be moved in the front-rear direction relative to the upper terminal block 22 and then rotated.

Subsequently, the lower terminal block 24 is placed against and fixed to the lower opening of the upper terminal block 22. Accordingly, the lower opening of the upper terminal block 22 is blocked, and the locking plate 78 is sandwiched between the upper terminal block 22 and the downward projecting portion 39 and upward projecting portion 60 of the lower terminal block 24 without a gap or with a slight gap. Accordingly, the attachment portion 20 can move substantially parallel with the front-rear direction substantially without becoming tilted relative to the upper terminal block 22. Since the lower opening of the upper terminal block 22 is covered by the lower terminal block 24, access to the locking plate 78 from the outside is impossible, and it is possible to reduce the risk of the locking plate 78 (attachment portion 20) unintentionally rotating and the attachment portion 20 coming out of the through hole 34. The upper terminal block 22 and the lower terminal block 24 may be fixed by welding, adhesion, or the like, or may be fixed by male-female fitting, bolt fixing, or the like.

The current-carrying member 14 is fixedly supported to the support portion 16 to which the attachment portion 20 has been attached. Specifically, the fixing portion 66 of the current-carrying member 14 is placed on the support surface 30 of the support portion 16, and the nut 46 housed in the housing recessed portion 44 is aligned with the through hole 74 provided in the fixing portion 66 of the current-carrying member 14. A fixing bolt 108 is then inserted into the through hole 74 and screwed into the nut 46, and thus the fixing portion 66 of the current-carrying member 14 is fixedly supported on the support surface 30 of the support portion 16. By superimposing the fixing portion 66 and a terminal fitting provided at the terminal end of an electric wire extending from the outside (not shown) and fastening them together with the fixing bolt 108, the electric wire extending from the outside and the current-carrying member 14 can be electrically connected.

The connection portion 18 of the current-carrying member 14 is placed on the holding plate portion 80 of the attachment portion 20 and attached to the holder 76. Specifically, the attachment position of the connection portion 18 on the attachment portion 20 is a position on the upper surface of the holding plate portion 80. At that time, the connection portion 18 and the holder 76 are positioned relative to each other due to the two positioning protruding portions 88 provided in the holder 76 being inserted into the two positioning recessed portions 72 provided in the connection portion 18. Accordingly, the through hole 70 provided in the connection portion 18 and the nut 94 housed in the fastener housing portion 92 of the attachment portion 20 are held in an aligned state. Specifically, the rear end of the connection portion 18 projects rearward from the rear opening 86 of the holder 76 and is coupled to the extendable portion 68, and the attachment portion 20 can move in the front-rear direction relative to the support portion 16 in accordance with extension and contraction of the extendable portion 68.

In the first embodiment, the support surface 30 that supports the fixing portion 66 is located higher than the attachment surface 32 provided with the through holes 34. Also, the support surface 30 is located higher than the upper surface of the holding plate portions 80 on which the connection portions 18 are placed. In particular, in the first embodiment, the support surface 30 is located at the same position as or slightly higher than the upper ends of the attachment portions 20. Accordingly, the fixing portions 66 are located higher than the connection portions 18, and the extendable portions 68, which extend forward from the fixing portions 66, are housed in the recessions 40 of the support portion 16. As shown in FIG. 6 as well, the extendable portion 68b and the curved wall portion 42 provided in the corresponding recession 40 are prevented from coming into contact with each other even when the extendable portion 68b has the smallest length in the front-rear direction, that is to say even when the extendable portion 68b has deformed to the most slack state.

The terminal connection unit 10 is assembled through the process described above. The following describes a method for connecting an electric wire 12 to the terminal connection unit 10. Although there are no limitations on the structure of the electric wire, it is sufficient that the terminal end of the electric wire is provided with a terminal fitting, and that a through hole formed in the terminal fitting. In the first embodiment, an engaging protruding portion 112 that projects to the left is provided at a peripheral edge portion of a terminal fitting 110.

More specifically, the terminal fitting 110 of the electric wire 12 extending from the front of the terminal connection unit 10 is inserted into the holder 76 of one of the attachment portions 20. At that time, for example, the attachment portion 20 is held in the right hand, the terminal fitting 110 is held in the left hand, and the terminal fitting 110 is inserted into the holder 76. Since the attachment portion 20 can move in the front-rear direction, the terminal fitting 110 can be easily inserted into the holder 76. The two front wall portions 87 of the holder 76 engage with the terminal fitting 110, thus making it possible to prevent the terminal fitting 110 from coming off from the attachment portion 20. Accordingly, the electric wire 12 extends forward through the front opening 84 of the holder 76. In the first embodiment, the vertical wall portion 82 on the left side is provided with the engaging recessed portion 90, and the terminal fitting 110 is also provided with the engaging protruding portion 112. The engaging recessed portion 90 and the engaging protruding portion 112 also engage with each other so as to prevent the terminal fitting 110 from coming off from the attachment portion 20.

In the first embodiment, the vertical wall portions 82 have an expanding shape, that is to say are inclined outward in the left-right direction while extending upward, and the insertion of the terminal fitting 110 into the holder 76 is guided by the inward surfaces of the vertical wall portions 82. In particular, in the first embodiment, due to the provision of the engaging recessed portion 90 and the engaging protruding portion 112, the engaging protruding portion 112 can be easily inserted into the engaging recessed portion 90 by sliding the engaging protruding portion 112 along the left vertical wall portion 82 in the front-rear direction, for example. Accordingly, the terminal fitting 110 and the holder 76 are positioned in the front-rear direction, and the through hole of the terminal fitting 110, the through hole 70 of the connection portion 18, and the nut 94 provided in the attachment portion 20 are aligned with each other.

After the through hole provided in the terminal fitting 110, the through hole 70 provided in the connection portion 18, and the nut 94 housed in the fastener housing portion 92 are aligned with each other, the fixing bolt 114 is inserted and screwed into the nut 94. Accordingly, the electric wire 12 and the current-carrying member 14 are fastened together, and the electric wire 12 and the current-carrying member 14 are electrically connected.

As described above, the electric wire 12 has a large diameter, and it is difficult for tolerance to be absorbed by bending or the like. In other words, for example, even if the ends of the electric wires 12 on the side opposite to the side connected to the terminal connection unit 10 are fixed at the same specific location, the lengths in the front-rear direction may be different, as shown in the electric wires 12a and 12b, depending on the tolerance. Even in such a case, in the terminal connection unit 10 of the first embodiment, by causing the extendable portions 68 to undergo deformation, it is possible to adjust the lengths of the extendable portions 68 in the front-rear direction, that is to say the positions of the connection portions 18 and the attachment portions 20 in the front-rear direction. Therefore, positional tolerance between the terminal fittings 110 and the connection portions 18 can be absorbed. The connection portions 18 and the terminal fittings 110 are not provided with an elongated hole as in conventional structures, and a sufficient area of contact between the connection portions 18 and the terminal fittings 110 can be secured, and therefore the problem of increased heat generation can be avoided.

In the first embodiment, the extendable portions 68 are each constituted by a laminated bus bar, and therefore extension/contraction deformation of the extendable portions 68 in the front-rear direction can be easily realized.

In the first embodiment, the attachment portion 20 is not fixed at a predetermined moving position relative to the support portion 16, but rather is displaceable in the front-rear direction, which is the first direction. In other words, even after the electric wire 12 and the current-carrying member 14 are connected, the connection portion 18 and the attachment portion 20 can move in the front-rear direction. Therefore, displacement of the electric wire 12 can be absorbed even in the case where the electric wire 12 extends or contracts due to the surrounding thermal environment or is subjected to vibration due to the traveling of the vehicle, for example.

In the first embodiment, the recession 40 is provided in the support portion 16, and the extendable portion 68 of the current-carrying member 14 is housed in the recession 40. In particular, in the first embodiment, the bottom wall portion of the recession 40 is partially constituted by the curved wall portion 42, and even when the extendable portion 68 has the shortest length, contact between the extendable portion 68 and the bottom surface of the recession 40 is avoided. Accordingly, for example, when the extendable portion 68 contracts, it is possible to avoid a problem such as the contraction of the extendable portion 68 being restricted due to the extendable portion 68 coming into contact with the bottom surface of the recession 40.

In the first embodiment, the support surface 30 on which the fixing portions 66 of the current-carrying members 14 are supported is located higher than the upper surface of the holding plate portion 80 on which the connection portions 18 of the current-carrying members 14 are supported. In particular, in the first embodiment, the support surface 30 is located higher than the entirety of the connection portions 18. Accordingly, in the current-carrying members 14, the fixing portions 66 are located higher than the connection portions 18, and therefore the risk of the extendable portions 68 coming into contact with the attachment portions 20 during extension/contraction deformation of the extendable portions 68 is lower than in the case where, for example, the fixing portions are located lower than the connection portions. As a result, displacement of the connection portions 18 and the attachment portions 20 can be realized more smoothly.

In the first embodiment, the attachment portion 20 is provided with the fastener housing portion 92 that houses the nut 94, which is a fastener component. Accordingly, the electric wire 12 and the current-carrying member 14 are electrically connected by placing the connection portion 18 of the current-carrying member 14 and the terminal fitting 110 of the electric wire 12 on the attachment portion 20 and fastening them together with the fixing bolt 114. Therefore, the tasks of fixing and electrically connecting the electric wire 12 can be realized efficiently.

In the first embodiment, both the locking plate 78 of the attachment portion 20 and the through hole 34 provided in the support portion 16 have a substantially oval shape. Accordingly, with a simple operation of inserting the locking plate 78 into the through hole 34 and rotating the locking plate 78, the attachment portion 20 can be attached to the support portion 16 in a state where detachment is prevented and displacement in the front-rear direction is allowed.

In particular, in the first embodiment, the positioning protrusions 102 and the positioning protrusion insertion portions 36 are provided at peripheral edge portions of the locking plate 78 and peripheral edge portions of the through hole 34, and the locking plate 78 and the through hole 34 are positioned relative to each other when the former is inserted into the latter. In other words, if the positioning protrusions 102 and the positioning protrusion insertion portions 36 are not aligned with each other, the attachment portion 20 cannot be detached from the support portion 16, and thus a highly effective disconnection prevention effect can be exhibited.

Second Embodiment

Figure 11:
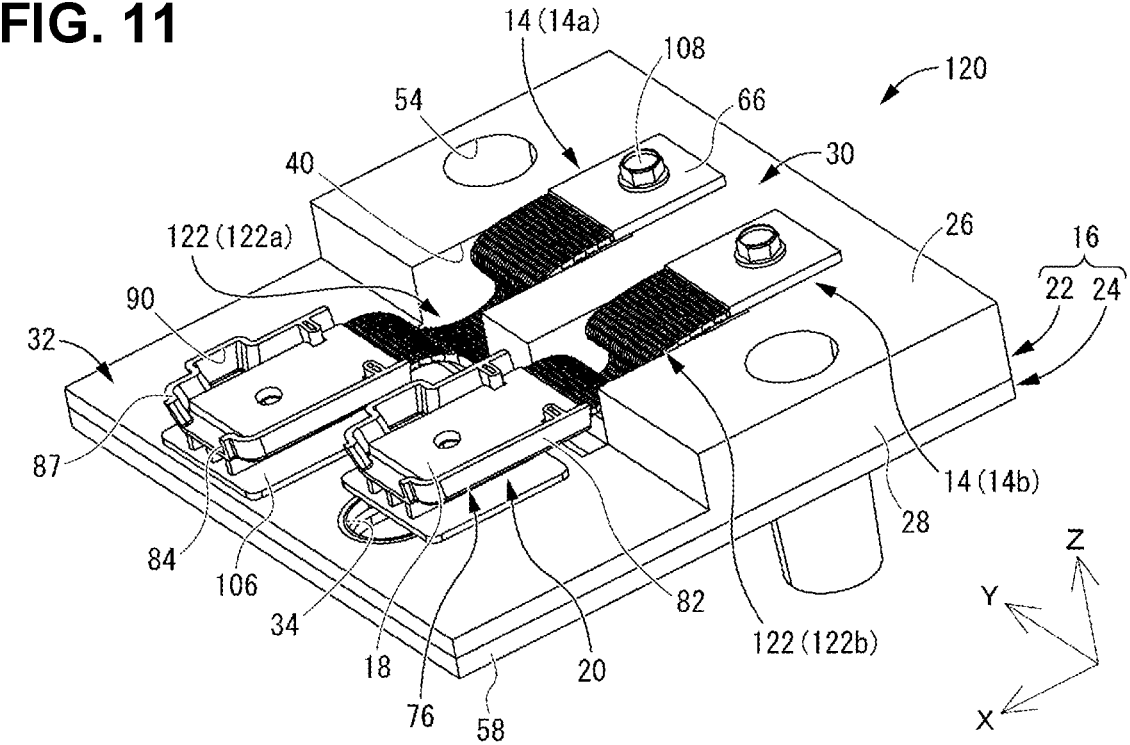
FIG. 11 is a perspective view of a terminal connection unit according to a second embodiment.

Next, a second embodiment of the present disclosure will be described with reference to FIG. 11. A terminal connection unit 120 shown in FIG. 11 has an overall structure similar to that of the terminal connection unit 10 of the first embodiment, but the structure of extendable portions 122 is different. Specifically, the extendable portions 122 of the second embodiment are each constituted by a braided wire formed by braiding a plurality of metal wires. Although there are no limitations on how the metal wires are braided, conventionally known methods of braiding and weaving, such as knitting, braiding, and weaving, can be adopted. In the second embodiment as well, an extendable portion 122a in the most extended state and an extendable portion 122b in the most contracted state are shown together. In the following description, members and portions substantially the same as those in the first embodiment are designated by the same reference numerals as those in the first embodiment, and detailed descriptions thereof will be omitted.

The extendable portions 122 formed by braided wires can also extend and contract in the front-rear direction, which is the first direction, and therefore effects similar to those of the first embodiment can be exhibited.

Other Embodiments

The technology described herein is not limited to the embodiments described above and in the drawings, and for example, the following embodiments are also included in the technical scope of the technology described herein.

(1) In the above embodiments, the extendable portions 68 and 122 are curved so as to protrude downward in the most elongated state (extendable portions 68a and 122a), and protrude further downward upon contracting from that state. As another example, the extendable portions may be curved so as to protrude upward in the most elongated state, and may protrude further upward upon contracting from that state.

(2) In the above embodiments, the fastener component housed in the fastener housing portion 92 is the nut 94, but the fastener component housed in the fastener housing portion may be a bolt that protrudes upward, for example. In this case, the head of the bolt may be fixed, by male-female fitting, to a fastener housing portion that has a structure similar to that of the above embodiments. The member housed in the housing recessed portion 44 may also be a bolt instead of the nut 46.

(3) In the above embodiments, the attachment portion 20 is displaceable relative to the support portion 16 in the front-rear direction, but as another example, the attachment portion may be fixed at a predetermined position in the front-rear direction relative to the support portion.

(4) The shape of the support portion can be changed according to the positional relationship with surrounding members and the like, and is not limited to the modes described in the above embodiments. The shapes of the fixing portion and the connection portion of the current-carrying member are not limited to being a rectangular shape in a plan view, and may be appropriately set according to the shape of the support portion and the like.

(5) In the above embodiments, the attachment portion 20 and the terminal fitting 110 are provided with the engaging recessed portion 90 and the engaging protruding portion 112, but these portions are not essential. In the above embodiments, the vertical wall portion 82 protrudes upward with an inclination, but may protrude straight upward. The vertical wall portion 82 is not essential in the present disclosure.

(6) The terminal connection unit according to aspects of the present disclosure is not limited to being provided for a terminal block structure as in the above embodiments, and may be provided at a portion for connection with an external electric wire in an electrical connection box in which a current-carrying member is housed in a case.

(7) In the above embodiments, for the sake of clarity, the electric wires 12a and 12b having different lengths and the current-carrying members 14a and 14b having different lengths corresponding to the electric wires 12a and 12b are shown. However, the number of current-carrying members provided in the terminal connection unit according to aspects of the present disclosure does not need to be two, and may be one or three or more.

LIST OF REFERENCE NUMERALS

10 Terminal connection unit
12, 12a, 12b Electric wire
14, 14a, 14b Current-carrying member
16 Support portion
18 Connection portion
20 Attachment portion
22 Upper terminal block
24 Lower terminal block
26 Upper bottom wall portion
28 Peripheral wall portion
30 Support surface
32 Attachment surface
34 Through hole
36 Positioning protrusion insertion portion
38 Rib
39 Downward projecting portion
40 Recession
42 Curved wall portion
44 Housing recessed portion
46 Nut
47 Holding tube portion
48 Deformation allowing space
50, 52 Inclined surface
54 Through hole
56 Bottom wall portion
58 Peripheral wall portion
60 Upward projecting portion
62 Curved wall portion
64 Bolt insertion hole
66 Fixing portion
68, 68a, 68b Extendable portion
70 Through hole
72 Positioning recessed portion
74 Through hole
76 Holder
78 Locking plate
79 Bottom surface
80 Holding plate portion
82 Vertical wall portion
84 Front opening
86 Rear opening
87 Front wall portion
88 Positioning protruding portion
90 Engaging recessed portion
92 Fastener housing portion
94 Nut (fastener component)
95 Holding tube portion 96 Deformation allowing space
98, 100 Inclined surface
101 Through hole
102 Positioning protrusion
104 Coupling portion
106 Guide plate portion
108 Fixing bolt
110 Terminal fitting
112 Engaging protruding portion
114 Fixing bolt
120 Terminal connection unit
122, 122a, 122b Extendable portion

The invention claimed is:

1. A terminal connection unit comprising:
a current-carrying member including a connection portion configured to be connected to a terminal fitting provided at a terminal end of an electric wire; and
a support portion configured to fixedly support the current-carrying member,
wherein the current-carrying member includes a fixing portion configured to be fixed to the support portion, and an extendable portion that couples the connection portion and the fixing portion and is extendable and contractable in a first direction,
the support portion includes an attachment portion configured to be attached to the connection portion, the attachment portion being displaceable in the first direction,
the support portion includes a through hole that is elongated in the first direction,
the attachment portion includes a holder configured to hold the connection portion, an elongated locking plate arranged facing a bottom surface of the holder across a gap, and a coupling portion that couples the locking plate to the bottom surface,
the locking plate is insertable into the through hole when a lengthwise direction of the locking plate is matched with the first direction, and the attachment portion is attached at a normal position relative to the support portion by inserting the locking plate into the through hole and rotating the holder such that the lengthwise direction is orthogonal to the first direction, and
when the attachment portion is at the normal position, the locking plate engages with a peripheral edge portion of the through hole, and the attachment portion is attached to the support portion in a state where detachment is prevented and displacement in the first direction is allowed.

2. The terminal connection unit according to claim 1, wherein the extendable portion of the current-carrying member is constituted by a laminated bus bar in which multiple layers of metal plates are stacked.

3. The terminal connection unit according to claim 1, wherein the extendable portion of the current-carrying member is constituted by a braided wire.

4. The terminal connection unit according to claim 1, wherein the attachment portion is displaceable in the first direction while attached to the support portion.

5. The terminal connection unit according to claim 1, wherein the support portion includes a recession configured to accommodate the extendable portion.

6. The terminal connection unit according to claim 1, wherein the support portion includes a support surface configured to support the fixing portion of the current-carrying member, and
an attachment position of the connection portion on the attachment portion is no higher than a height position of the support surface.

7. The terminal connection unit according to claim 1, wherein the attachment portion includes a fastener housing portion in which a fastener component is housed.

8. The terminal connection unit according to claim 1, wherein a positioning protrusion is provided at a peripheral edge portion of the locking plate, and a positioning protrusion insertion portion is provided at a peripheral edge portion of the through hole.

* * * * *